United States Patent
Yamano et al.

(10) Patent No.: US 9,272,589 B2
(45) Date of Patent: Mar. 1, 2016

(54) CARRIER VEHICLE AND COUPLING MECHANISM

(75) Inventors: Ikuo Yamano, Yokohama (JP); Takekazu Kakinuma, Sumida-ku (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 285 days.

(21) Appl. No.: 13/055,627

(22) PCT Filed: Jun. 26, 2009

(86) PCT No.: PCT/JP2009/002940
§ 371 (c)(1),
(2), (4) Date: Jan. 24, 2011

(87) PCT Pub. No.: WO2010/013386
PCT Pub. Date: Feb. 4, 2010

(65) Prior Publication Data
US 2011/0121541 A1 May 26, 2011

(30) Foreign Application Priority Data

Jul. 31, 2008 (JP) .................................. 2008-198596

(51) Int. Cl.
*B60D 1/02* (2006.01)
*B60D 1/00* (2006.01)
(Continued)

(52) U.S. Cl.
CPC .. B60D 1/02 (2013.01); B60D 1/00 (2013.01); B60D 1/50 (2013.01); B60D 3/00 (2013.01);
(Continued)

(58) Field of Classification Search
CPC .............. B60D 1/02; B60D 1/50; B60D 3/00; A01B 59/048

USPC ......... 280/515, 400, 481, 442, 474, 483, 484; 403/116
See application file for complete search history.

(56) References Cited

U.S. PATENT DOCUMENTS 2,339,155 A * 1/1944 Cusack .......................... 280/204
2,369,984 A * 2/1945 Rutter ............................ 280/489
(Continued)

FOREIGN PATENT DOCUMENTS

DE          955 653 C      1/1957
DE       91 02 791 U1      7/1991
(Continued)

OTHER PUBLICATIONS

Office Action issued Oct. 25, 2011 in JP 2008-198596 and partial translation thereof.
(Continued)

*Primary Examiner* — Anne Marie Boehler
*Assistant Examiner* — Maurice Williams
(74) *Attorney, Agent, or Firm* — Kenyon & Kenyon LLP

(57) ABSTRACT

The carrier vehicle includes a coaxial two-wheel vehicle including two wheels arranged on the same axial centerline, a cart, and a coupling mechanism to couple the coaxial two-wheel vehicle to the cart. The coupling mechanism 4 includes a roll rotation tolerance portion that tolerates, when a traveling direction of the coaxial two-wheel vehicle is defined as a roll axis, rotation of the coaxial two-wheel vehicle in a roll direction. Further, the coupling mechanism includes a pitch rotation tolerance portion that tolerates, when a left-and-right direction of the coaxial two-wheel vehicle is defined as a pitch axis, rotation of the coaxial two-wheel vehicle in a pitch direction.

12 Claims, 9 Drawing Sheets

(51) Int. Cl.
   *B60D 1/50*   (2006.01)
   *B60D 3/00*   (2006.01)
   *B62K 3/00*   (2006.01)
   *B62B 3/14*   (2006.01)
   *B62B 5/00*   (2006.01)

(52) U.S. Cl.
   CPC .............. *B62K 3/007* (2013.01); *B62B 3/1476* (2013.01); *B62B 5/0006* (2013.01); *B62B 5/0079* (2013.01); *B62B 2202/24* (2013.01)

(56) References Cited

U.S. PATENT DOCUMENTS

| | | | | |
|---|---|---|---|---|
| 2,410,280 | A * | 10/1946 | Fergason | 280/514 |
| 2,545,723 | A * | 3/1951 | Conner | 56/376 |
| 2,782,884 | A * | 2/1957 | Roessler | 280/514 |
| 3,054,622 | A | 9/1962 | Davis et al. | |
| 3,163,306 | A * | 12/1964 | Bennett et al. | 414/498 |
| 3,485,314 | A | 12/1969 | Herr | |
| 3,575,250 | A * | 4/1971 | Dykes | 180/11 |
| 3,834,726 | A * | 9/1974 | Hobza | 280/87.041 |
| 3,900,212 | A * | 8/1975 | Ewing | 280/406.2 |
| 3,953,055 | A * | 4/1976 | Stark | 280/504 |
| 4,096,920 | A * | 6/1978 | Heyn | 180/11 |
| 4,298,212 | A * | 11/1981 | Jamison | 280/515 |
| 4,351,541 | A * | 9/1982 | Propst et al. | 280/408 |
| 4,440,417 | A * | 4/1984 | Kirchner | 280/479.3 |
| 4,483,550 | A * | 11/1984 | Dubbe | 280/515 |
| 4,585,133 | A | 4/1986 | Cope | |
| 4,771,840 | A * | 9/1988 | Keller | 180/11 |
| 5,288,001 | A * | 2/1994 | Locarno | 224/407 |
| 5,312,122 | A * | 5/1994 | Doty | 280/33.992 |
| 5,403,143 | A * | 4/1995 | Ito | 414/469 |
| 5,484,150 | A * | 1/1996 | Yasutomi | 280/79.3 |
| 5,848,797 | A * | 12/1998 | Paez | 280/33.993 |
| 5,851,020 | A * | 12/1998 | Godwin et al. | 280/413 |
| 5,857,692 | A * | 1/1999 | Hayes et al. | 280/410 |
| 5,966,936 | A * | 10/1999 | Pruitt | 60/520 |
| 6,186,521 | B1 * | 2/2001 | Divoky et al. | 280/33.993 |
| 6,572,122 | B2 * | 6/2003 | Johnson et al. | 280/33.993 |
| 7,527,279 | B1 * | 5/2009 | McCalip | 280/474 |
| 7,699,128 | B1 * | 4/2010 | Strauss | 180/65.1 |
| 2002/0063006 | A1 * | 5/2002 | Kamen et al. | 180/171 |
| 2004/0093728 | A1 * | 5/2004 | Hendricks | 29/888.042 |
| 2004/0129464 | A1 | 7/2004 | Arling et al. | |
| 2004/0195803 | A1 * | 10/2004 | Brown | 280/504 |
| 2004/0251660 | A1 * | 12/2004 | Roe et al. | 280/515 |
| 2005/0194754 | A1 * | 9/2005 | Van Den Bosch et al. | 280/47.34 |
| 2006/0011398 | A1 * | 1/2006 | Kamen et al. | 180/218 |
| 2007/0145707 | A1 * | 6/2007 | Johnson | 280/202 |
| 2008/0147281 | A1 * | 6/2008 | Ishii et al. | 701/49 |
| 2009/0067955 | A1 * | 3/2009 | Yokoyama et al. | 414/217 |
| 2011/0316254 | A1 * | 12/2011 | Bui et al. | 280/477 |

FOREIGN PATENT DOCUMENTS

| | | |
|---|---|---|
| DE | 42 26 969 A1 | 2/1994 |
| EP | 0 326 754 A2 | 8/1989 |
| EP | 1 201 596 A1 | 5/2002 |
| JP | 52-077157 U | 6/1977 |
| JP | 56-069508 U | 6/1981 |
| JP | 56-82612 A | 7/1981 |
| JP | 1984-18605 U | 2/1984 |
| JP | 60-189613 A | 9/1985 |
| JP | 2004-500277 A | 1/2004 |
| JP | 2004-345608 A | 12/2004 |
| JP | 2006-076330 A | 3/2006 |
| JP | 2006-298157 A | 11/2006 |
| JP | 2006-315666 A | 11/2006 |
| JP | 2007-7168 A | 1/2007 |
| JP | 2008-012956 A | 1/2008 |
| JP | 2008-120347 A | 5/2008 |
| JP | 2008-126900 A | 6/2008 |

OTHER PUBLICATIONS

Extended European Search Report mailed Sep. 27, 2012.

* cited by examiner

CARRIER VEHICLE AND COUPLING MECHANISM

This is a 371 national phase application of PCT/JP2009/002940 filed 26 Jun. 2009, claiming priority to Japanese Patent Application No. JP 2008-198596 filed 31 Jul. 2008, the contents of which are incorporated herein by reference.

TECHNICAL FIELD

The present invention relates to a carrier vehicle and a coupling mechanism, in particular to a carrier vehicle in which a cart loaded with baggage or people is pushed or pulled by a coaxial two-wheel vehicle to convey the baggage or people, and a coupling mechanism used in the carrier vehicle.

BACKGROUND ART

It has been considered that coaxial two-wheel vehicles have such a configuration that they are smaller and lighter and have higher operability in comparison to other vehicles such as automobiles and motorcycles. Therefore, they may possibly be used, for example, in vast facilities such as airports. Therefore, it might be useful if a cart loaded with baggage or the like can be coupled to the coaxial two-wheel vehicle so that a carrier vehicle can be formed from the cart and the coaxial two-wheel vehicle.

Accordingly, Patent literature 1, for example, discloses a cart that is coupled to a coaxial two-wheel vehicle so that the cart can be pulled by the coaxial two-wheel vehicle. The cart is coupled to the coaxial two-wheel vehicle in such a manner that the rotation of the coaxial two-wheel vehicle in the yaw direction and the pitch direction can be tolerated.

Meanwhile, Patent literature 2 discloses a coaxial two-wheel vehicle having such a structure that the coaxial two-wheel vehicle turns by rotating the vehicle main body in the roll direction. In this coaxial two-wheel vehicle, the vehicle main body, which is composed of a parallel link mechanism, is disposed in such a manner that the vehicle main body can rotate in the left-and-right direction of the coaxial two-wheel vehicle. Wheels are rotatably disposed in vertical links on both sides, i.e., left and right sides of the vehicle main body. Step plates on which a rider rides are provided on the upper ends of the vertical links of the vehicle main body. In the coaxial two-wheel vehicle, when a rider riding on the step plates tilts a turning operation portion coupled to the vehicle main body, the turning operation portion is tilted and the opposed links of the vehicle main body rotate while the opposed links are maintained in the paralleled state. In this state, the vertically-arranged horizontal links of the vehicle main body are horizontally disposed. The coaxial two-wheel vehicle has such a configuration that the vehicle detects the tilting angle of the turning operation portion with respect to the vertically-arranged horizontal links by using a sensor, and thereby turns by changing the rotation speeds of left and right wheels. In the coaxial two-wheel vehicle like this, since the step plates are tilted toward the turning center as the vehicle main body is rotated during the turning action, the user can be brought into a state where the user can easily cope with the centrifugal force.

CITATION LIST

Published Japanese Translation of PCT International Publication for Patent Application, No. 2004-500277
Japanese Unexamined Patent Application Publication No. 2006-315666

SUMMARY OF INVENTION

Technical Problem

The cart disclosed in Patent literature 1 cannot be coupled to the coaxial two-wheel vehicle in such a manner that the rotation of the coaxial two-wheel vehicle in the roll direction is tolerated. Therefore, if one of the left and right wheels of the coaxial two-wheel vehicle runs over a step and the coaxial two-wheel vehicle is thereby tilted, it cannot absorb the tilt. Accordingly, there is a possibility that the traveling of the carrier vehicle could be disrupted.

Further, when the coaxial two-wheel vehicle is configured such that it does not turn unless the vehicle main body is rotated in the roll direction of the coaxial two-wheel vehicle as in the case of the coaxial two-wheel vehicle disclosed in Patent literature 2, it cannot serve as a carrier vehicle.

That is, there is no publicly-known carrier vehicle in which a cart is coupled to a coaxial two-wheel vehicle in such a manner that the rotation of the coaxial two-wheel vehicle in the roll direction can be tolerated.

An object of the present invention is to provide a carrier vehicle in which a cart is coupled to a coaxial two-wheel vehicle in such a manner that the rotation of the coaxial two-wheel vehicle in the roll direction can be tolerated, and its coupling mechanism.

Solution to Problem

A carrier vehicle in accordance with the present invention is a carrier vehicle including: a coaxial two-wheel vehicle including two wheels arranged on a same axial centerline; a cart; and a coupling mechanism to couple the coaxial two-wheel vehicle with the cart, wherein the coupling mechanism includes a roll rotation tolerance portion that tolerates, when a traveling direction of the coaxial two-wheel vehicle is defined as a roll axis, rotation of the coaxial two-wheel vehicle in a roll direction. With the configuration like this, it is possible to excellently provide a carrier vehicle in which a cart is coupled to a coaxial two-wheel vehicle in such a manner that the rotation of the coaxial two-wheel vehicle in the roll direction can be tolerated.

The coupling mechanism preferably also includes a pitch rotation tolerance portion that tolerates, when a left-and-right direction of the coaxial two-wheel vehicle is defined as a pitch axis, rotation of the coaxial two-wheel vehicle in a pitch direction. With the configuration like this, even when the coaxial two-wheel vehicle approaches a lengthwise-inclined slope and the coaxial two-wheel vehicle is thereby rotated in the pitch direction, the coupling mechanism can excellently tolerate the rotation of the coaxial two-wheel vehicle in the pitch direction.

The coupling mechanism includes a pin disposed in one of the coaxial two-wheel vehicle and the cart and a pin receiving member disposed in the other of the coaxial two-wheel vehicle and the cart. In the pin receiving member, an insertion hole having an internal diameter larger than an external diameter of the pin is formed. The pin is preferably disposed in a roughly vertical direction, and an end portion of the pin is inserted into the pin receiving member. The roll rotation tolerance portion and the pitch rotation tolerance portion are preferably formed between the end portion of the pin and the insertion hole of the pin receiving member. With the configuration like this, a coupling mechanism that tolerates rotation of the coaxial two-wheel vehicle in the roll direction and the pitch direction can be realized just by inserting the pin into the insertion hole of the pin receiving member.

The cart is preferably coupled in front of the coaxial two-wheel vehicle. With the configuration like this, a user can operate the carrier vehicle while observing the state of the baggage in a state where the user is on board the coaxial two-wheel vehicle.

In the peripheral portion of the pin, a reactive force member such as a spring is preferably disposed between the coupling portion between the pin and the coaxial two-wheel vehicle or the cart, and the pin receiving member. With the configuration like this, when the coaxial two-wheel vehicle accidentally rotates forward, the rotational force is transferred to the reactive force member such as a spring through the pin receiving member. The reactive force member such as a spring can excellently resist the forward rotational force of the coaxial two-wheel vehicle by the reactive force from the cart, so that the coaxial two-wheel vehicle is prevented from toppling over.

The cart is preferably a wheeled platform, and preferably includes a base portion and free casters disposed on the under surface of the base portion. Further, the pin is preferably disposed in a rear end portion of the base portion.

The free caster(s) disposed on the front side of the cart is preferably disposed in the base portion in such a manner that the free caster can slide in the traveling direction of the cart. With the configuration like this, when the free caster disposed on the traveling-direction side of the cart bumps into a step portion, the free caste slides backward. As a result, the inertial force acted on the coaxial two-wheel vehicle can be reduced.

The cart is preferably a carry bag, and the coupling mechanism preferably further includes a belt wound around the carry bag, and a support member which is threaded through the belt and on which the pin or the pin receiving member is disposed. With the configuration like this, a carry bag, i.e., baggage of a user can be directly conveyed, for example, in a facility such as an airport.

The pin and the pin receiving member preferably have a detachable configuration. With the configuration like this, when the coaxial two-wheel vehicle and the cart are used independently of each other, it is possible to prevent the pin and the pin receiving member from bumping against and thereby damaging other components.

The coaxial two-wheel vehicle preferably performs a turning action by rotating the vehicle main body in the roll direction.

A coupling mechanism in accordance with the present invention is a coupling mechanism that is used when the above-described coaxial two-wheel vehicle is coupled to the cart to form a cattier vehicle. The coupling mechanism includes a roll rotation tolerance portion that tolerates, when a traveling direction of the coaxial two-wheel vehicle is defined as a roll axis, rotation of the coaxial two-wheel vehicle in a roll direction. With the configuration like this, it is possible to excellently provide a carrier vehicle in which the cart is coupled to the coaxial two-wheel vehicle in such a manner that the rotation of the coaxial two-wheel vehicle in the roll direction can be tolerated.

Advantageous Effects of Invention

In accordance with the present invention, a carrier vehicle in which a cart is coupled to a coaxial two-wheel vehicle in such a manner that the rotation of the coaxial two-wheel vehicle in the roll direction can be tolerated, and its coupling mechanism can be provided.

DESCRIPTION OF EMBODIMENTS

<First exemplary embodiment>

Exemplary embodiments of a carrier vehicle in accordance with the present invention are explained hereinafter in detail with reference to the drawings. However, the present invention is not limited to the exemplary embodiments shown below. Further, to clarify the explanation, the following description and drawings are partially simplified as appropriate. Incidentally, the pitch axis in the present invention is an axis corresponding to the axle of the left and right wheels 13, and the roll axis is an axis that passes through the center of the vehicle main body 12 and is parallel to the travelling direction of the coaxial two-wheel vehicle. Note that the rotation in the roll direction in the present invention means not only rotation on the roll axis in the narrow sense, but also rotation in the left-and-right direction in the broad sense. The same holds true for the pitch direction.

Figure 1:
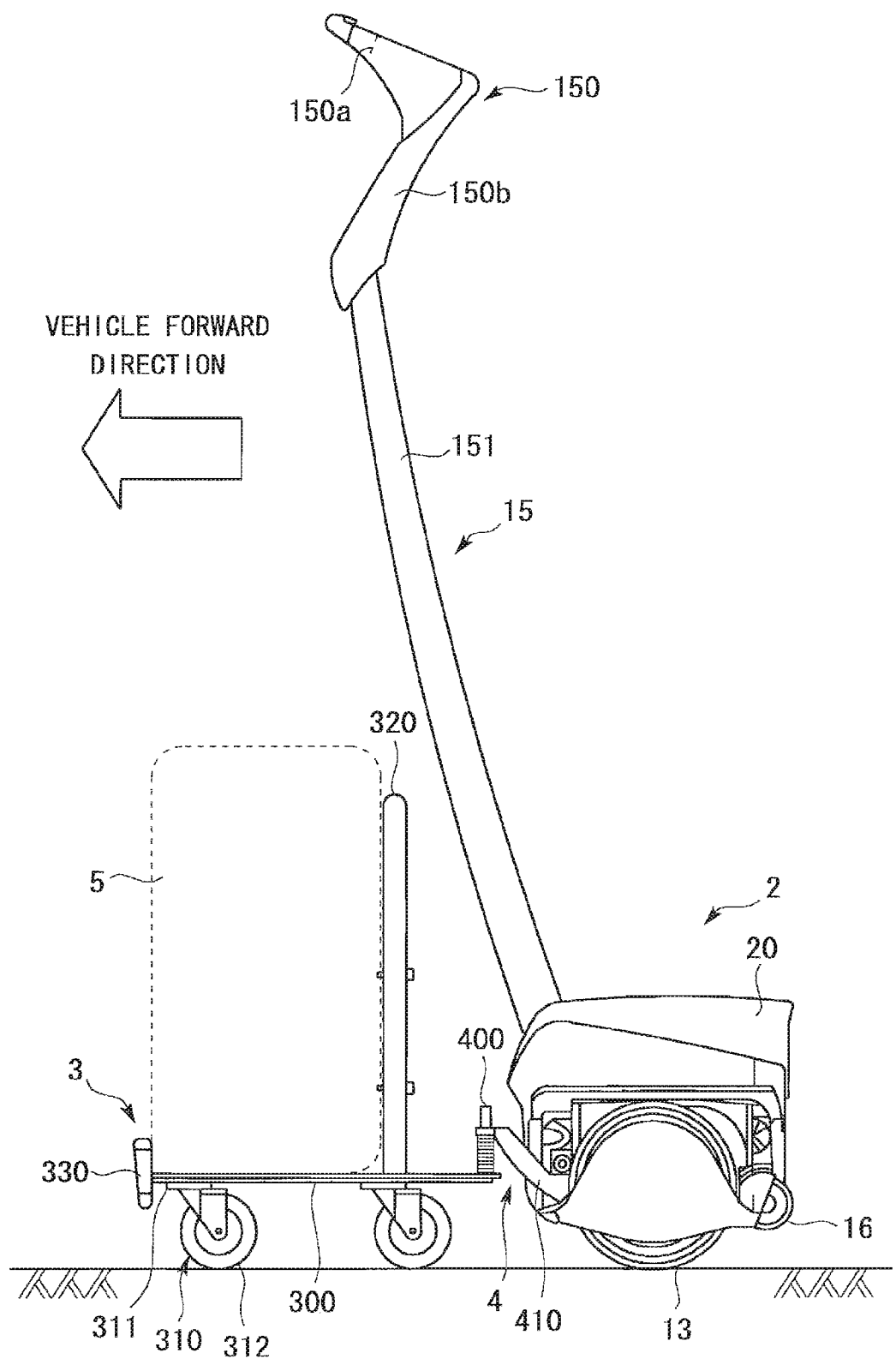
FIG. 1 is a side view showing a carrier vehicle of a first exemplary embodiment in accordance with the present invention.
Figure 2:
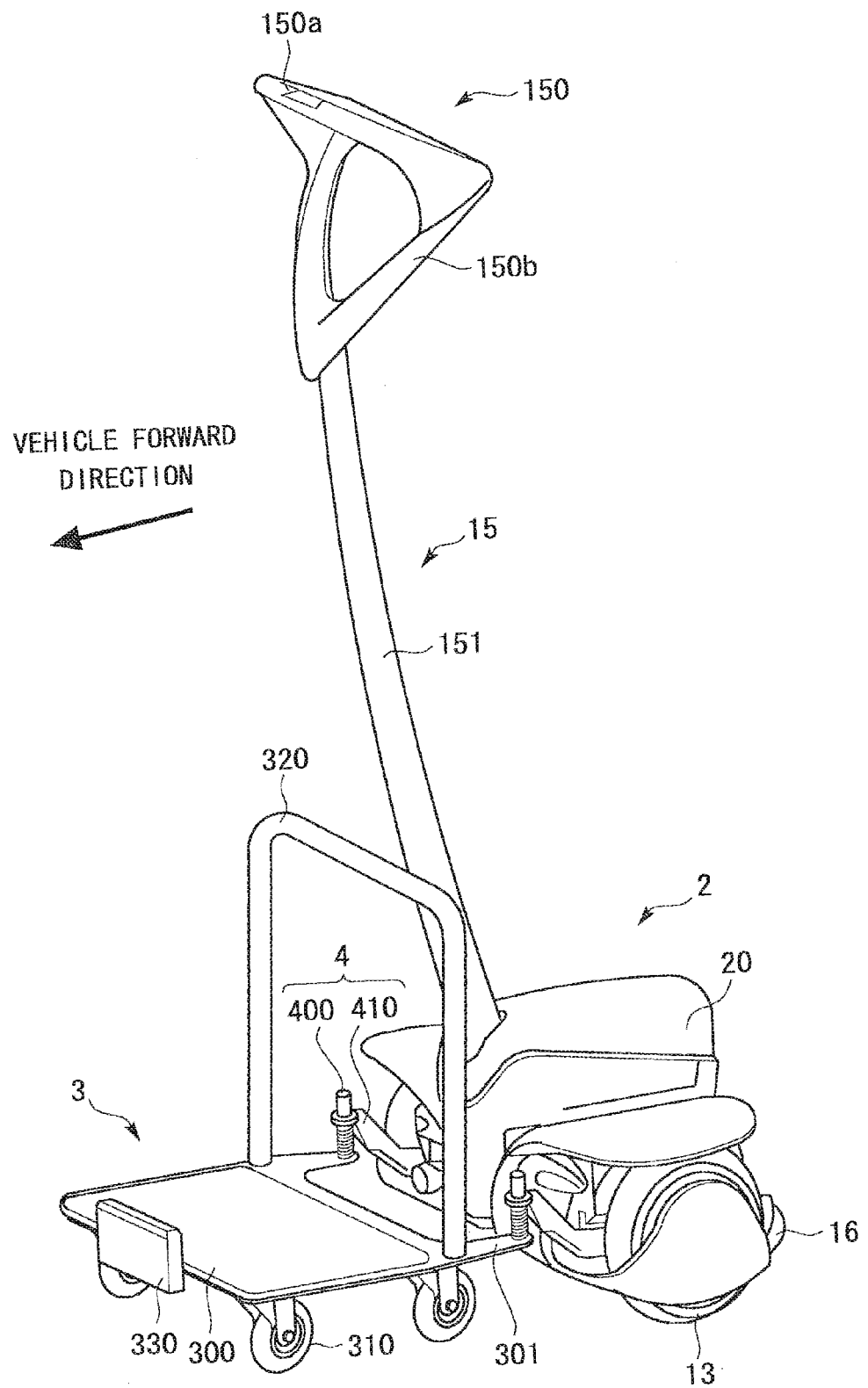
FIG. 2 is a perspective view showing a carrier vehicle of a first exemplary embodiment in accordance with the present invention.
Figure 3:
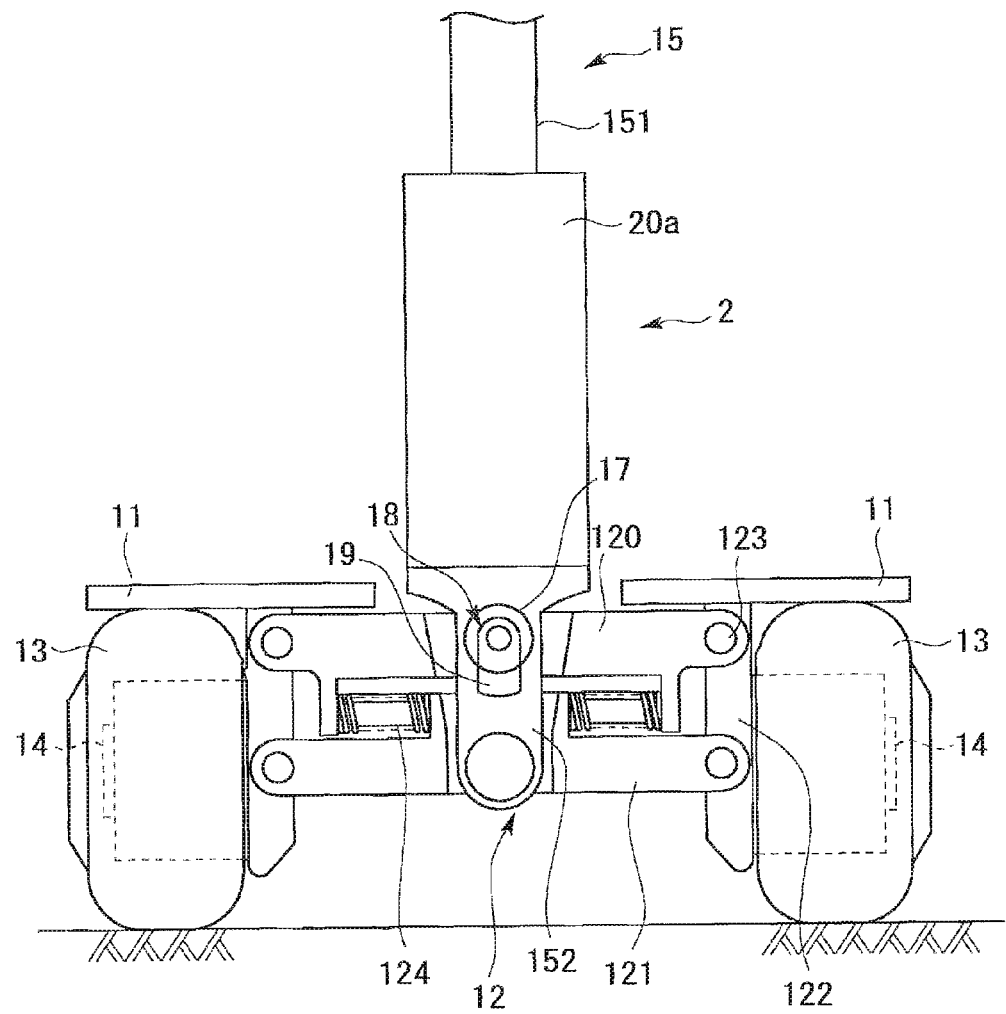
FIG. 3 is a front view schematically showing a form of a vehicle main body of a coaxial two-wheel vehicle exhibited when the coaxial two-wheel vehicle moves straight.

As shown in FIGS. 1 and 2, a carrier vehicle 1 includes a coaxial two-wheel vehicle 2, a cart 3, and a coupling mechanism 4. As shown in FIG. 3, the coaxial two-wheel vehicle 2 includes a vehicle main body 12, wheels 13, wheel drive units 14, and a turning operation unit 15.

The vehicle main body 12 has a parallel link mechanism disclosed in Patent literature 2. The details of the vehicle main body 12 are explained with reference to FIG. 3.

The vehicle main body 12 includes two horizontal links 120 disposed on the upper side, two horizontal links 121 disposed on the lower side, and two vertical links 122 disposed on both of the left and right sides to constitute a parallel link mechanism. A shaft receiving hole is formed in the middle portion in the lengthwise direction of the horizontal links 120. The shaft receiving hole penetrates the horizontal link 120 in the forward/backward direction. A shaft receiving hole that penetrates the horizontal link 120 in the forward/backward direction is also formed in each of the left and right end portions of the horizontal links 120. These two horizontal links 120 are disposed so as to sandwich upper end portions of the vertical links 122 at each of both end portions of the two horizontal links 120.

The horizontal links 121 have a similar structure to that of the horizontal links 120. These two horizontal links 121 are disposed so as to sandwich lower end portions of the vertical links 122 at each of both end portions of the two horizontal links 121.

Each of the vertical links 122 is composed of a flat plate member. A shaft receiving hole is formed in each of the upper and lower end portions of the vertical links 122. The shaft receiving hole penetrates the vertical links 122 in the forward/backward direction. These vertical links 122 are disposed between the two vertically-arranged horizontal links 120 and 120 and the two vertically-arranged horizontal links 121 and 121 at their end portions. Further, the shaft receiving holes of the vertical links 122 are disposed on the same axial centerlines as those of the shaft receiving holes of the horizontal links 120 and 121. Turning support pins 123 are inserted in such a manner that they pass through these shaft receiving holes in a reciprocal manner. As a result, the horizontal links 120 and 121 and the vertical links 122 are formed as a parallel link mechanism that can rotate in the roll direction of the coaxial two-wheel vehicle 2. Incidentally, the horizontal links 120 and 121 are connected with each other by a restoration member(s) 124 such as a spring. With this configuration, the vehicle main body 12 is restored from a state where the vehicle main body 12 is rotated in the roll direction to the original state. That is, the vertical links 122 are restored from a tilted parallelogram state to a rectangular state.

The wheel drive units 14 are attached on the exterior surfaces of the vertical links 122. Each of the wheel drive units 14 can be constructed, for example, from an electric motor, a series of reduction gears that are coupled to the rotation axis of the electric motor so that the power can be transferred from the rotation axis to the reduction gears, and the like. Each of the wheel drive units 14 is composed of a fixed portion fixed to the vertical link 122 and a rotating portion that is supported on the fixed portion so that the rotating portion can freely rotate. The wheels 13 are attached to the respective rotating portions. In this way, the left and right wheels 13, which are supported on the respective vertical links 122 through the respective wheel drive units 14, are arranged in such a manner that their rotation centers are aligned on the same axial centerline when the coaxial two-wheel vehicle is placed on a flat road surface.

Further, the upper end portions of the vertical links 122 protrude upward from the upper surfaces of the horizontal links 120. Step plates 11 are individually attached on upper end surfaces of the vertical links 122. The left and right step plates 11 extend horizontally at the same height with certain space in the left-and-right direction therebetween. The distance between the left and right step plates 11 may be equal to a distance between both feet of a human being when he/she stands in a natural state.

The turning operation unit 15 is operation means to perform a turning operation by tilting the turning operation unit 15 itself in the roll direction. The turning operation unit 15 includes a handle 150, a handle bar 151, and a handle bar bracket 152.

The handle 150 includes a grip portion 150*a* that has a ring shape when viewed from the top, and a support portion 150*b* that supports the grip portion 150*a* from the behind. A user can stabilize his/her posture by grasping the grip portion 150*a* during traveling and during a getting-on/off action. Further, when a wheel(s) for transportation 16 is provided on the rear surface of the vertical link 122 of the vehicle main body 12, for example, the coaxial two-wheel vehicle 2 itself can be transported by dragging the coaxial two-wheel vehicle 2. In this case, the user tilts the coaxial two-wheel vehicle 2 backward by grasping the grip portion 150*a* and drags the coaxial two-wheel vehicle 2 in a state where the coaxial two-wheel vehicle 2 is supported on the wheel for transportation 16. The lower end portion of the support portion 150*b* is coupled to the handle bar 151. The lower end portion of the handle bar 151 is coupled to the upper end portion of the handle bar bracket 152.

The handle bar bracket 152 has such a shape that the handle bar bracket 152 straddles the central point of the vehicle main body 12 in the forward/backward direction. A front portion is provided in front of the handle bar bracket 152 and extends to the lower portion of the vehicle main body 12. Shaft receiving holes are formed in the front portion. The shaft receiving holes are disposed in such places that they correspond to the central shaft receiving holes of the vertically-arranged horizontal links 120 and 121 in front of the vertical links 122. The shaft receiving holes in the front portion are disposed on the same axial centerlines as those of the central shaft receiving holes of the horizontal links 120 and 121. A turning support shaft 17 is inserted so as to pass through the shaft receiving holes in a reciprocal manner.

A rear portion is provided behind the handle bar bracket 152 and extends to the lower portion of the vehicle main body 12, though its illustration is omitted in the figure. Shaft receiving holes are formed in the rear portion. The shaft receiving holes are disposed in such places that they correspond to the central shaft receiving holes of the vertically-arranged horizontal links 120 and 121 behind the vertical links 122. The shaft receiving holes in the rear portion are disposed on the same axial centerlines as those of the central shaft receiving holes of the horizontal links 120 and 121. A turning support shaft is inserted so as to pass through the shaft receiving holes in a reciprocal manner. Further, the turning support shafts disposed in the front and rear portions are disposed on the same axial centerline.

Figure 4:
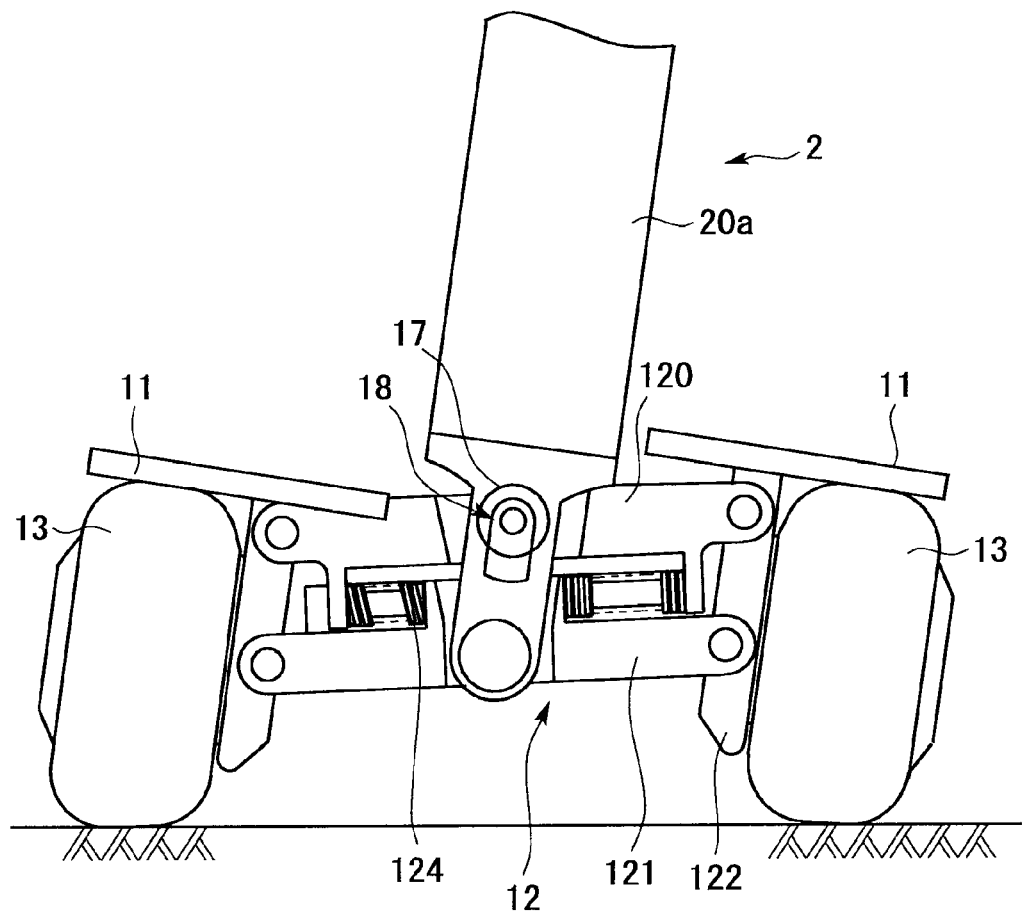
FIG. 4 is a front view schematically showing a form of a vehicle main body of a coaxial two-wheel vehicle exhibited when the coaxial two-wheel vehicle turns.

As shown in FIG. 4, when a user tilts the turning operation unit 15 having such a configuration in the roll direction, the vehicle main body 12 is also rotated in the roll direction in conjunction with the turning operation unit 15. Then, the step plates 11 and the wheels 13 are also tilted to the tilting direction of the turning operation unit 15 in conjunction with the rotation of the vehicle main body 12.

To detect the tilting angle (turning angle) of the turning operation unit 15, an angle detection sensor 18 is attached to the turning support shaft 17. The angle detection sensor 18 is composed of a shaft portion fixed to the turning support shaft 17, and a detection unit that detects an amount of relative rotational displacement from the shaft portion. The detection unit is fixed at one end of a fixed plate 19. The other end of the fixed plate 19 is fixed to the front portion of the handle bar bracket 152.

As for the angle detection sensor 18, for example, a potentiometer, a sensor having a variable-capacitor structure, or the like can be used. This angle detection sensor 18 detects the tilted angle of the handle bar bracket 152 with respect to the vehicle main body 12. In particular, the angle detection sensor 18 uses a fact that the resistance varies according to an amount of rotational displacement occurring between the shaft portion and the detection unit.

Incidentally, in the coaxial two-wheel vehicle 2 shown in FIGS. 1 and 2, the coupling portion between the handle bar bracket 152 and the horizontal links 120 and 121, and its periphery are covered with a cover member 20. A storage portion 20*a* is formed in a portion between the front and rear horizontal links 120 and 120 and the front and rear horizontal links 121 and 121 within the cover member 20. In this storage portion 20*a*, a battery 21, which is an specific example of the power supply to supply an electrical power to the left and right wheel drive units 14, the control device, other electronic devices and electric devices, and the like, are stored. Further, a drive circuit that drives the left and right wheel drive units 14 and the like, a posture detection sensor unit 22 that is posture detection means to detect the posture of the vehicle main body 12, the turning operation unit 15, and the like and to output their detection signals, and a control device 23 that outputs a control signal(s) used to control the driving of the left and right wheel drive units 14 and the like are also stored in the storage portion 20*a*. Since the heavy objects including the battery 21 are collectively stored in a place directly below the user who is on the left and right step plates 11, the concentration of the mass can be achieved and hence the operatively of the coaxial two-wheel vehicle can be improved.

Incidentally, FIGS. 3 and 4 are figures for explaining the configuration of the vehicle main body 12 and illustrate it in a schematic manner. Therefore, exact locations and shapes of the storage portion and the like are different from those shown FIGS. 1 and 2. That is, in the embodiment shown in FIGS. 3 and 4, the storage portion 20*a* is disposed above the handle bar bracket 152. The coaxial two-wheel vehicle in accordance with the present invention can be excellently practiced in both of the embodiment shown in FIGS. 1 and 2 and the embodiment shown in FIGS. 3 and 4.

Figure 5:
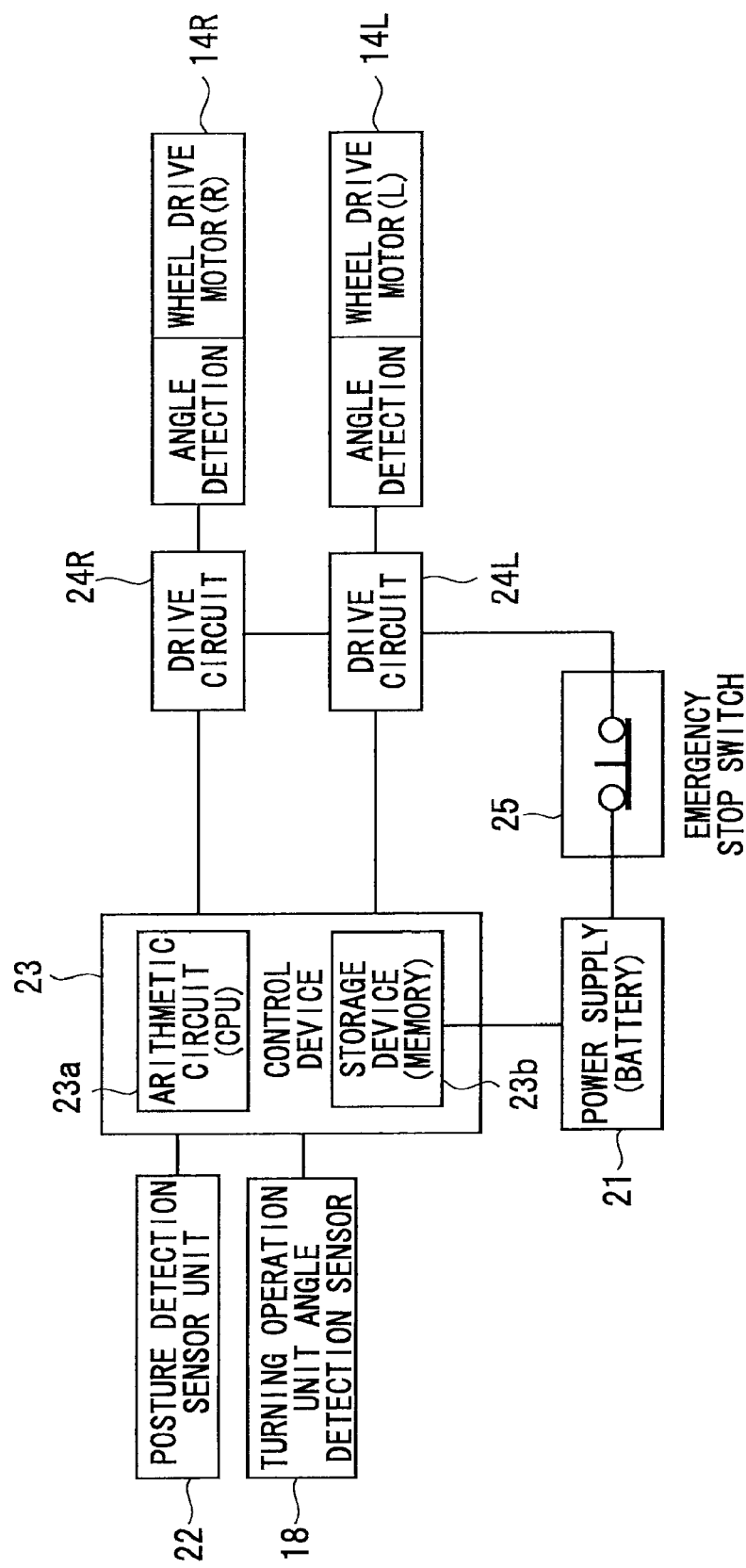
FIG. 5 is a block diagram showing a schematic configuration of a control unit of a coaxial two-wheel vehicle.

The control device 23 performs predetermined arithmetic processing based on a detection signal from the posture sensor unit 22, a detection signal from the angle detection sensor 18, and the like, and outputs a necessary control signal(s) to the left and right wheel drive units 14 and the like. As shown in FIG. 5, the control device 23 includes, for example, an arithmetic circuit 23*a* having a micro computer (CPU), a storage device 23*b* having a program memory, a data memory, other RAMs and ROMs, and the like. The battery 21 and the left and right drive circuits 24 (24L and 24R) are connected to the control device 23. The battery 21 and the left and right drive circuits 24 (24L and 24R) are also connected via an emergency stop switch 25. The drive circuits 24 (24L, and 24R) individually control the rotation speeds, the rotation directions, and the like of the left and right wheel 13. The left and right wheel drive units 14 (14L and 14R) are individually connected to the left and right drive circuits 24L and 24R.

A detection signal from the angle detection sensor 18 that detects an amount of the tilting of the turning operation portion 15 and a detection signal from the posture sensor unit 22 are input to the control device 23. The posture sensor unit 22 is used to detect an angular speed and an acceleration and to control the angular speed and acceleration when the coaxial two-wheel vehicle 2 is traveling. The posture sensor unit 22 is composed of, for example, a gyroscopic sensor and an acceleration sensor.

In the coaxial two-wheel vehicle 2 having the configuration like this, a user gets on the left and right step plates 11, and tilts the turning operation unit 15. At the same time, when the user applies his/her weight on the step plate by firmly pressing down his/her foot on the outer side with respect to the turning direction, the opposed links of the vehicle main body 12 rotates to the turning direction (roll tilting) while maintaining the parallel state as shown in FIG. 4. At this point, the angle detection sensor 18 detects a tilting amount of the turning operation unit 15 with respect to the horizontal links 120 and 121 in the horizontal state. The angle detection sensor 18 outputs the detected signal to the control device 23. Upon receiving the detected signal, the control device 23 performs predetermined arithmetic processing based on the detected signal. The control device 23 calculates how much the rotation speed of the wheel on the inner side with respect to the turning direction should be decreased, or how much the rotation speed of the wheel on the outer side with respect to the turning direction should be increased. The control device 23 outputs a signal indicating the calculation result to the wheel drive unit 14. Upon receiving the signal indicating the calculation result, the wheel drive unit 14 controls the rotation speed of the motor and thereby drives the wheel 13 based on the signal indicating the calculation result. In this way, by producing a difference between the rotation speeds of the left and right wheels 13 according to the tilting amount of the turning operation unit 15, the turning action is performed. During the turning action, the step plates 11 and the wheels 13 are tilted to the same direction as that of the turning operation unit 15. Therefore, the whole body including the user can be easily brought into a state where the centrifugal force can be easily coped with.

Further, in the coaxial two-wheel vehicle 2, the user gets on the left and right step plates 11, and shifts his/her weight forward or backward to rotate the coaxial two-wheel vehicle 2 forward or backward (pitch tilting). At this point, the posture detection sensor unit 22 detects the forward or backward tilting angle and the angular speed of the coaxial two-wheel vehicle 2. The posture detection sensor unit 22 outputs the detected signal to the control device 23. Upon receiving the detected signal, the control device 23 performs predetermined arithmetic processing based on the detected signal. The control device 23 calculates a drive torque required to stabilize the coaxial two-wheel vehicle 2 so that the coaxial two-wheel vehicle 2 does not topple over. The control device 23 outputs a signal indicating the calculation result to the wheel drive unit 14. Upon receiving the signal indicating the calculation result, the wheel drive unit 14 controls the motor and thereby drives the wheel 13 based on the signal indicating the calculation result. In this way, the traveling forward or backward is performed according to the rotation of the coaxial two-wheel vehicle 2 to the forward/backward direction.

The cart 3 is a hand cart. That is, as shown in FIGS. 1 and 2, the cart 3 includes a base portion 300, free casters 310, a frame portion 320, and a bumper 330.

Figure 6:
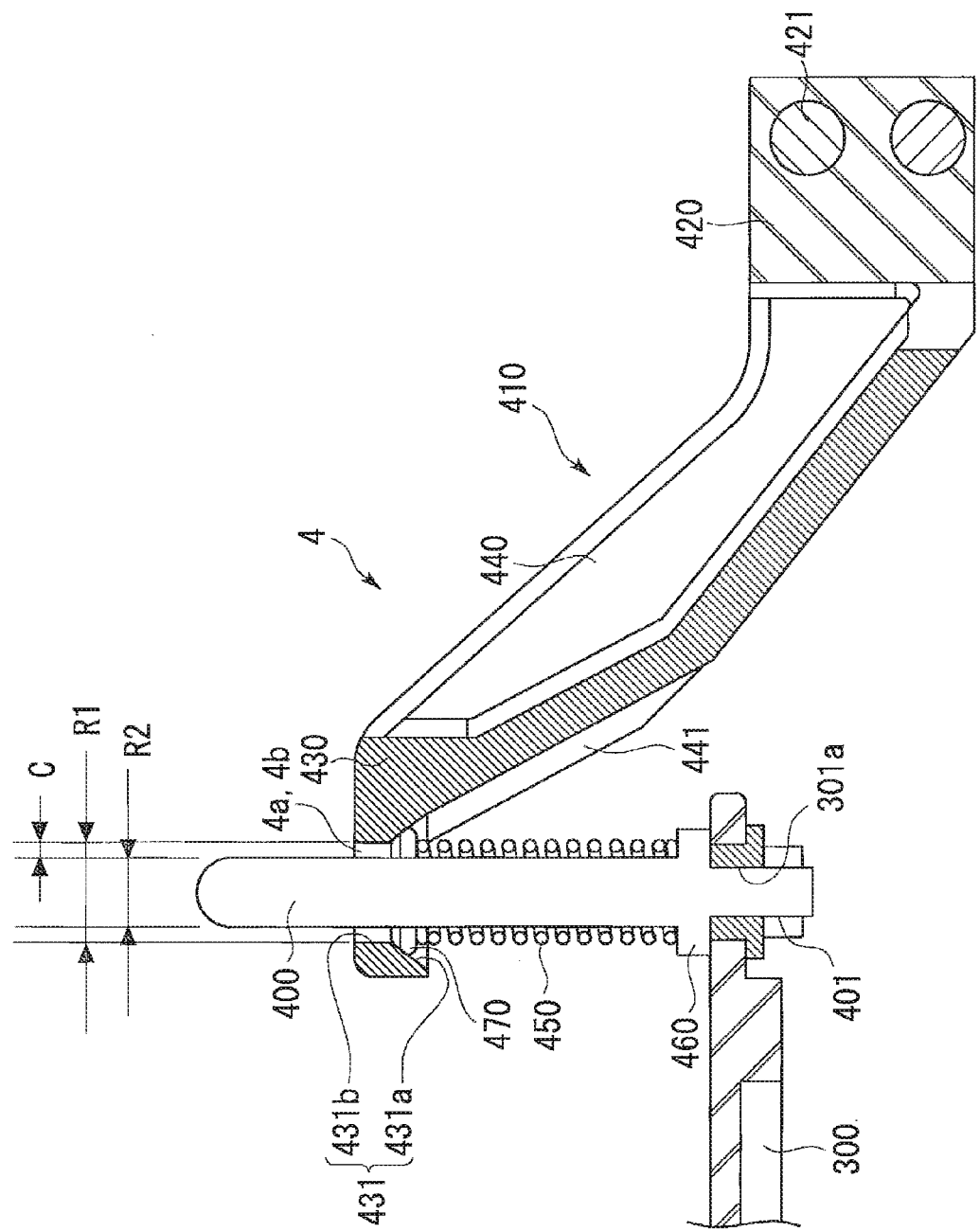
FIG. 6 is a cross-section showing a configuration of a coupling mechanism.

The base portion 300 has a roughly rectangular shape, and has an area large enough to load baggage 5, for example, as shown in FIG. 2. A protrusion 301 that is used to dispose a coupling mechanism 4 for coupling the coaxial two-wheel vehicle 2 behind the cart is formed in the rear end portion of the base portion 300. In particular, two protrusions 301 are disposed with space in the left-and-right direction therebetween. As shown in FIG. 6, a threaded hole 301*a* into which a threaded portion 401 of a pin 400 of the coupling mechanism 4 is screwed is formed in each of these protrusions 301.

In each of the free casters 310, a wheel 312 is rotatably coupled to a flange portion 311. In this exemplary embodiment, the free casters 310 are disposed at the four corners on the under surface of the base portion 300. The flange portion 311 of each free caster is attached on the under surface of the base portion 300. Note that an appropriate number of free casters may be disposed in an appropriate arrangement so that the cart 3 appropriately functions.

The frame portion 320 is a handrail portion. The frame portion 320 is a rod-like member bent into a U-shape. The frame portion 320 extends vertically from the rear portion on the upper surface of the base portion 300.

The bumper 330 is disposed in the front end portion of the base portion 300. The bumper 330 prevents damage of the base portion 300 when other members bump against the base portion 300 during traveling. The bumper 330 protrudes from the upper surface of the base portion 300 so that the baggage 5 can be sandwiched between the bumper 330 and the frame portion 320. The bumper 330 is made of cushioning material such as a resin.

The cart 3 having the configuration like this is coupled in front of the coaxial two-wheel vehicle 2 through the coupling mechanism 4. Note that in the coaxial two-wheel vehicle 2 shown in FIGS. 1 and 2, the handle bar 151 of the turning operation unit 15 is bent forward. Therefore, the portion directly below the handle bar 151 becomes dead space. By disposing the cart 3 in this dead space, the carrier vehicle 1 can be formed with a small size with efficiency. In addition, a user can operate the carrier vehicle 1 while observing the state of the baggage 5 in a state where the user is on board the coaxial two-wheel vehicle 2. Note that the baggage 5 loaded in the base portion 300 is fixed to the frame portion 320 by fixing means such as a belt.

As shown in FIG. 6, the coupling mechanism 4 includes a pin 400 and a pin receiving member 410. The pin 400 is a rod-like member having a circular shape in cross-section. A thread portion 401 is formed at one end of the pin 400. The thread portion 401 of the pin 400 is screwed into the threaded hole 301a formed in the protrusion 301 of the base portion 300 in the cart 3. The pin 400 is disposed in the cart 3 and extends roughly in the vertical direction from the base portion 300.

The pin receiving member 410 includes a base portion 420, a horizontal portion 430, and a coupling portion 440. The base portion 420 is a block member in which both of the left and right sides are formed as flat surfaces. In the base portion 420, a plurality of bolt holes 421 are formed so as to penetrate the base portion 420 in the horizontal direction.

Figure 7:
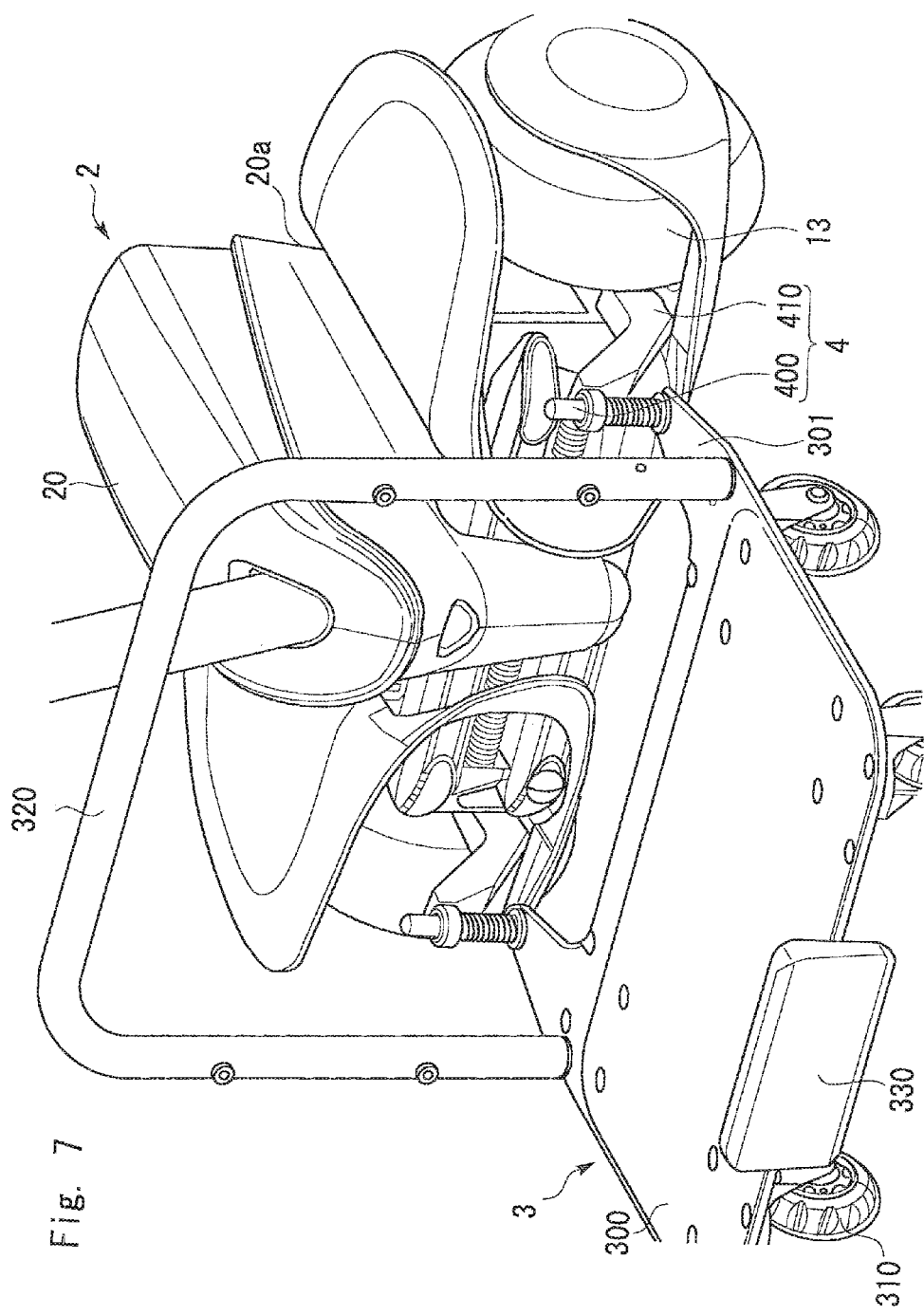
FIG. 7 is a perspective view showing an enlarged coupling mechanism and its periphery in a carrier vehicle of a first exemplary embodiment in accordance with the present invention.

As shown in FIGS. 6 and 7, an insertion hole 431 is formed in the horizontal portion 430. The upper end portion of the pin 400 is inserted into the insertion hole 431. In the insertion hole 431, a funnel portion 431a is formed in such a manner that it is tapered in the upward direction. The funnel portion 431a is formed so as to extend from the lower end of the insertion hole 431 to roughly the middle of the insertion hole 431. Further, in the insertion hole 431, a cylinder-shaped through-hole 431b is formed from the upper end of the funnel portion 431a to the upper end of the insertion hole 431. The internal diameter R1 of the upper-end opening portion of the funnel portion 431a and the through-hole 431b is larger than the external diameter R2 of the pin 400. The base portion 420 and the horizontal portion 430 are coupled and thereby integrated with each other through the coupling portion 440 extending in a diagonally upward direction.

As shown in FIG. 7, the pin receiving member 410 is coupled on the outer surface of the vertical link 122 of the vehicle main body 12 in the coaxial two-wheel vehicle 2. That is, a threaded hole for a bolt that is formed in advance on the outer surface of the vertical link 122 and the bolt hole 421 of the base portion 420 of the pin receiving member 410 are arranged on the same axial centerline. By screwing a bolt into the threaded hole through the bolt hole 421, the pin receiving member 410 is disposed on the vertical link 122.

The upper end portion of the pin 400 disposed in the cart 3 is inserted in the insertion hole 431 of the pin receiving member 410 disposed on the coaxial two-wheel vehicle side. Therefore, the coaxial two-wheel vehicle 2 and the cart 3 are coupled with each other at the two places that are spaced from each other in the left-and-right direction through the coupling mechanism 4. However, the number of the coupling places is not limited to any particular number.

As described above, the insertion hole 431 of the pin receiving member 410 has the internal diameter R1 larger than the external diameter R2 of the pin 400. Therefore, a clearance C is formed between the insertion hole 431 of the pin receiving member 410 and the pin 400. As a result, the coupling mechanism 4 is configured so as to be equipped with a roll rotation tolerance portion 4a to tolerate the rotation of the coaxial two-wheel vehicle 2 in the roll direction and a pitch rotation tolerance portion 4b to tolerate the rotation in the pitch direction. Note that the size of the clearance C is determined with consideration given to the maximum rotational angles in the roll direction and the pitch direction during the operation of the coaxial two-wheel vehicle 2, the angle of a slope on which the coaxial two-wheel vehicle 2 and the cart 3 travel, and similar factors.

In this way, the coupling mechanism 4 to tolerate the rotation of the coaxial two-wheel vehicle 2 in the roll direction and the pitch direction can be realized just by inserting the pin 400 into the insertion hole 431 of the pin receiving member 410. Therefore, a person who does not have any special skill can easily couple the coaxial two-wheel vehicle 2 to the cart 3, and disengage the coupling state.

In addition, the pin 400 is configured so as to be screwed into the threaded hole 301a of the cart 3. The pin receiving member 410 is configured so as to join the base portion 420 to the vehicle main body 12 of the coaxial two-wheel vehicle 2 by using a bolt. That is, the pin 400 and the pin receiving member 410 have a detachable configuration. Therefore, when the coaxial two-wheel vehicle 2 and the cart 3 are used independently of each other, it is possible to prevent the pin 400 and the pin receiving member 410 from bumping against and thereby damaging other components.

Note that the height of the pin 400 is preferably determined so that, when the pin 400 is to be removed from the insertion hole 431 of the pin receiving member 410, they can be disengaged from each other by rotating the coaxial two-wheel vehicle 2 backward more widely in comparison to when causing the coaxial two-wheel vehicle 2 to travel to the reverse direction. Further, the height of the pin 400 is preferably adjusted so that, when the pin 400 is to be inserted into the insertion hole 431 of the pin receiving member 410, the pin 400 can be inserted to the insertion hole 431 by rotating the coaxial two-wheel vehicle 2 forward from a backward-rotated state to bring the coaxial two-wheel vehicle 2 into a neutral state.

Further, in the front portion of the coupling portion 440 of the pin receiving member 410, a guide groove 441 is preferably formed in the vertical direction. The guide groove 441 continuously extends to the funnel portion 431a of the insertion hole 431. When the pin 400 is to be inserted into the insertion hole 431 of the pin receiving member 410 by rotating the coaxial two-wheel vehicle 2 forward as described above, the front-end portion of the pin 400 is temporarily engaged in the guide groove 441. By doing so, the pin 400 can be guided to the insertion hole 431 of the pin receiving member 410 without deviating from the insertion hole 431.

With the configuration described above, the carrier vehicle 1 in which the cart 3 is coupled to the coaxial two-wheel vehicle 2 in such a manner that the rotation of the coaxial two-wheel vehicle 2 in the roll direction can be tolerated can be excellently provided. Accordingly, even when one of the left and right wheels of the coaxial two-wheel vehicle 2 runs over a step and the coaxial two-wheel vehicle 2 is thereby tilted in the roll direction, the coupling mechanism 4 can excellently tolerate the rotation of the coaxial two-wheel vehicle 2 in the roll direction.

Further, as in the case of this exemplary embodiment, a coaxial two-wheel vehicle 2 that cannot perform a turning action unless the vehicle main body 12 is rotated in the roll direction can be used as the coaxial two-wheel vehicle of the carrier vehicle 1. That is, the coupling mechanism 4 can excellently tolerate the rotation of the vehicle main body 12 in the roll direction when the coaxial two-wheel vehicle 2 is performing a turning action.

Meanwhile, the carrier vehicle 1 is also configured so as to tolerate the rotation of the coaxial two-wheel vehicle 2 in the pitch direction. Therefore, even when the coaxial two-wheel vehicle 2 approaches a lengthwise-inclined slope and the coaxial two-wheel vehicle 2 is thereby rotated in the pitch direction, the coupling mechanism 4 can excellently tolerate the rotation of the coaxial two-wheel vehicle 2 in the pitch direction.

Further, as in the case of this exemplary embodiment, a coaxial two-wheel vehicle 2 that cannot perform a forward movement or a backward movement unless the coaxial two-wheel vehicle is rotated in the pitch direction can be used as the coaxial two-wheel vehicle 2 of the carrier vehicle 1. That is, the coupling mechanism 4 can excellently tolerate the rotation of the vehicle main body 12 in the pitch direction when the coaxial two-wheel vehicle 2 is performing a forward movement or a backward movement.

Note that when the cart 3 gets snagged on a step, the coaxial two-wheel vehicle 2 coupled to the cart 3 could rotate forward by the inertial force and possibly topple over in the forward direction. Therefore, as shown in FIG. 6, a reactive force member 450 such as a spring is preferably disposed between the upper surface of the base portion 300 of the cart 3 and the under surface of the horizontal portion 430 of the pin receiving member 410 on the periphery of the pin 400. In this exemplary embodiment, a washer 470 is joined to the upper end portion of the reactive force member 450 such as a spring. The reactive force member 450 such as a spring to which the washer 470 is joined is engaged onto the pin 400. The lower end portion of the reactive force member 450 such as a spring is in contact with a flange portion 460 formed on the upper end of the thread portion 401 of the pin 400. The upper end portion of the reactive force member 450 such as a spring is inserted inside the funnel portion 431a of the pin receiving member 410. When the coaxial two-wheel vehicle 2 is accidentally rotated forward as described above, the handle bar 151 of the coaxial two-wheel vehicle 2 comes into contact with the frame portion 320 of the cart 3. At the same time, the rotational force is transferred to the reactive force member 450 such as a spring through the pin receiving member 410. The reactive force member 450 such as a spring can excellently resist the forward rotational force of the coaxial two-wheel vehicle 2 by the reactive force from the cart 3. As a result, it can prevent the coaxial two-wheel vehicle 2 from toppling over. The distance between the handle bar 151 of the coaxial two-wheel vehicle 2 and the frame portion 320 of the cart 3 in the coupled state is determined so that, when the coaxial two-wheel vehicle 2 is rotated forward and the coaxial two-wheel vehicle 2 thereby travels forward, the following relation is satisfied. That is, the distance is determined so that the handle bar 151 of the coaxial two-wheel vehicle 2 does not come into contact with the frame portion 320 of the cart 3. Further, the distance is determined so that it comes into contact with the frame portion 320 when the coaxial two-wheel vehicle 2 is rotated forward by a larger amount than the tilting amount by which the coaxial two-wheel vehicle 2 is tilted when the coaxial two-wheel vehicle 2 to travel forward. However, the distance may be changed as appropriate depending on the weight of the baggage loaded in the cart 3 and the like. In short, it may be such a distance that, when the coaxial two-wheel vehicle 2 is accidentally rotated forward, the handle bar 151 of the coaxial two-wheel vehicle 2 comes into contact with the frame portion 320 of the cart 3.

In addition, when the coaxial two-wheel vehicle 2 suddenly stops, the cart 3 tends to rotate forward due to the inertial force exerted on the baggage 5. In this occasion, the forward rotation of the cart 3 can be suppressed by the reactive force member 450 such as a spring. Further, the rattling of the cart 3, which would occur when the coaxial two-wheel vehicle 2 is accelerated or decelerated, can be also prevented by the reactive force member 450 such as a spring, thus preventing the impairment of the operability.

In the carrier vehicle 1 having the configuration like this, the base portion 300 of the cart 3 is loaded with the baggage 5, and the coaxial two-wheel vehicle 2 is operated by the user riding on the coaxial two-wheel vehicle 2 in that state. As a result, the cart 3 is pushed by the coaxial two-wheel vehicle 2 in an interlocking manner. Therefore, when the carrier vehicle 1 is used in a vast facility such as an airport in which there are a number of pieces of baggage, for example, the baggage can be easily conveyed together with people. Needless to say, the carrier vehicle 1 can be also excellently used in other facilities such as factories.

In addition, the coaxial two-wheel vehicle 2 having the above-described configuration is used as the coaxial two-wheel vehicle of the carrier vehicle 1. In the coaxial two-wheel vehicle 2, when the coaxial two-wheel vehicle turns, the step plates 11 are tilted toward the turning center while the vehicle main body 12 is rotated. Therefore, the user can be easily brought into a state where the user can easily cope with the centrifugal force.

<Second exemplary embodiment>

Although the flange portion 311 of each free caster 310 is directly coupled to the base portion 300 in the cart 3 in accordance with the first exemplary embodiment, the present invention is not limited to this configuration.

Figure 8A:
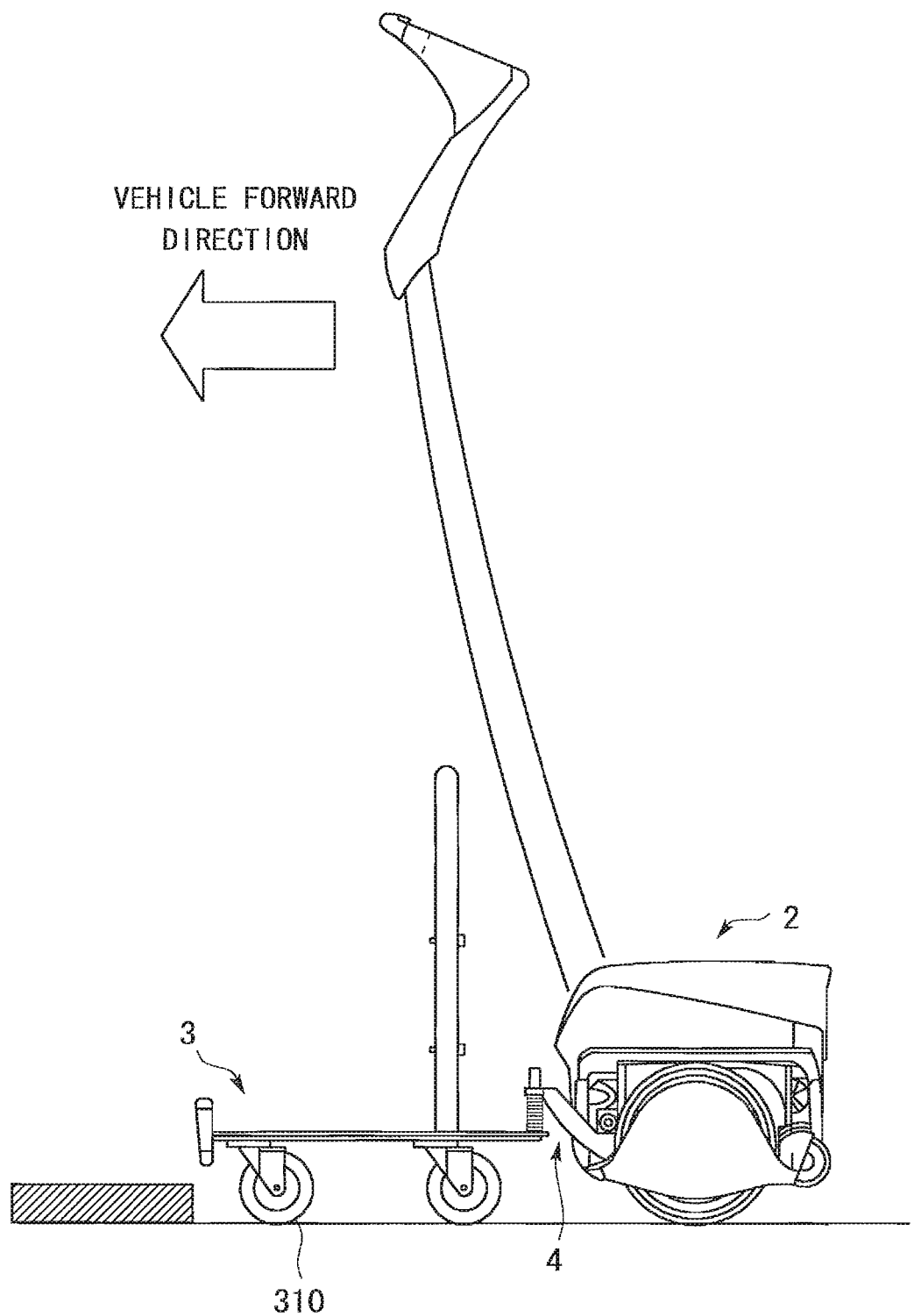
FIG. 8A is a side view showing a carrier vehicle of a second exemplary embodiment in accordance with the present invention in a normal state.
Figure 8B:
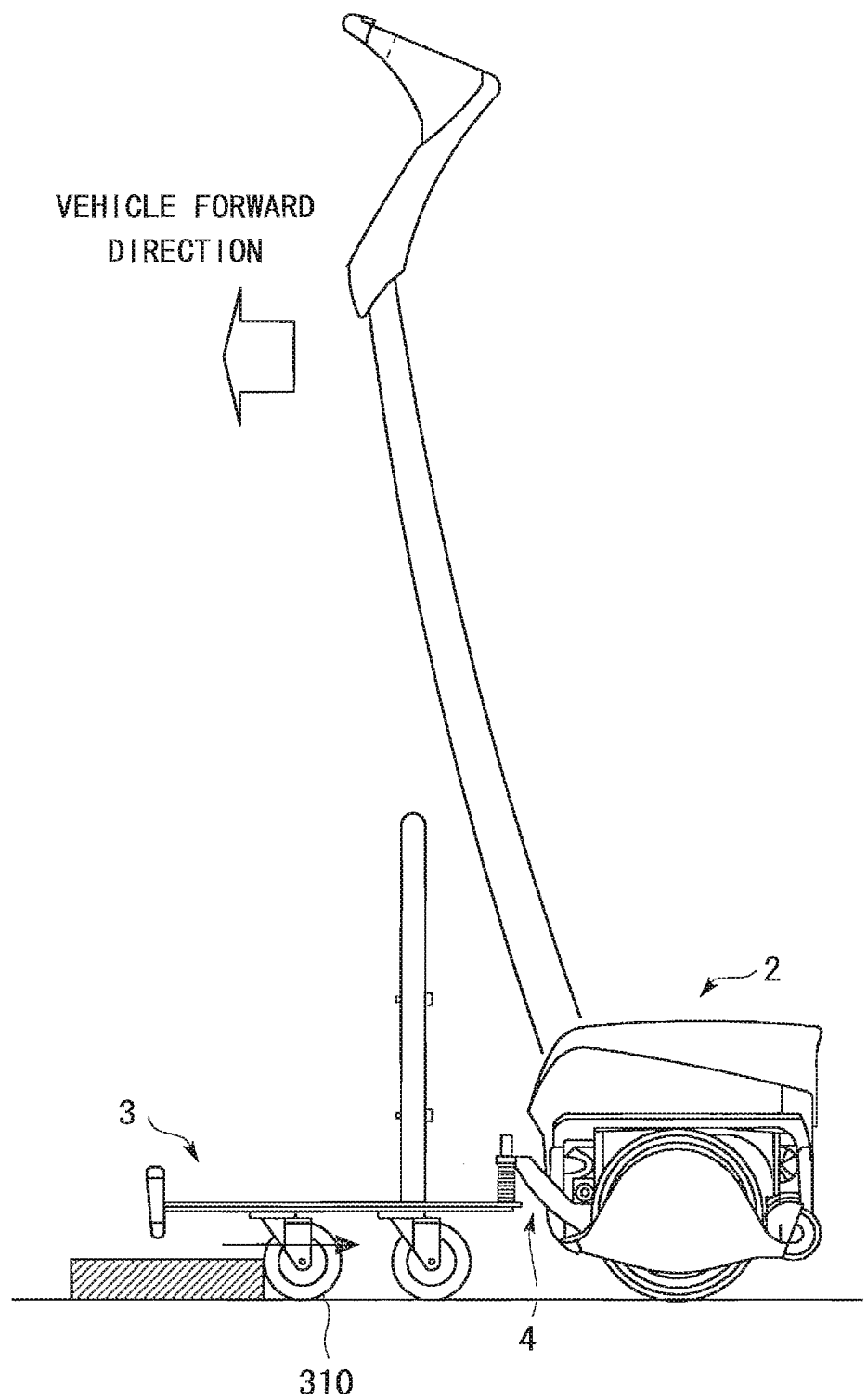
FIG. 8B is a side view showing a carrier vehicle of a second exemplary embodiment in accordance with the present invention exhibited when the carrier vehicle bumps into a step portion.

That is, the free caster(s) 310 disposed on the front side of the cart 3 may be disposed in the base portion 300 of the cart 3 in such a manner that the free caster can slide in the traveling direction of the cart 3. In this way, as shown in FIGS. 8A and 8B, for example, when the free caster 310 disposed on the front side of the cart 3 bumps into a step portion during traveling, the free caster slides backward. As a result, the inertial force acted on the coaxial two-wheel vehicle 2 can be reduced.

Note that the slide mechanism of the free caster 310 may be realized, for example, by using a slide rail in which a U-shaped inner rail portion is slidably engaged in a U-shaped outer rail portion. The outer rail portion is coupled to the base portion 300 of the cart 3. Meanwhile, the flange portion 311 of the free caster 310 is coupled to the inner rail portion. Further, the inner rail portion is configured in such a manner that when the inner rail portion is slid backward, it is returned to the original front position by a restoration member such as a spring.

<Third exemplary embodiment>

Although the cart 3 has a similar structure to that of a conventional hand cart in the first and second exemplary embodiments, the present invention is not limited to this structure. A carry bag composed of a box-shaped case and free casters attached on the under surface of the box-shaped case may be used as the cart. In this case, a coupling mechanism including, in addition to the above-described pin 400 and the pin receiving member 410, a belt wound around the carry bag, and a support member which is threaded through the belt and on which the pin 400 is disposed is preferably used. The belt is wound around the carry bag so that the pin 400 is disposed on the coaxial two-wheel vehicle side. Then, by inserting the pin 400 into the insertion hole 431 of the pin receiving member 410 disposed in the coaxial two-wheel vehicle, a carrier vehicle can be formed.

With the configuration like this, a carry bag, i.e., baggage of a user can be directly conveyed, for example, in a facility such as an airport.

<Fourth exemplary embodiment>

Although the pin 400 is disposed in the cart and the pin receiving member 410 is disposed in the coaxial two-wheel vehicle 2 in the first to third exemplary embodiments, the reverse configuration may be also employed. Further, although the upper end portion of the pin 400 is inserted into the insertion hole 431 of the pin receiving member 410 in the exemplary embodiments, the lower end portion of the pin 400 may be inserted into the insertion hole 431 of the pin receiving member 410.

Although the roll rotation tolerance portion and the pitch rotation tolerance portion are configured as a single structure in the first to third exemplary embodiments, the roll rotation tolerance portion and the pitch rotation tolerance portion may be configured as separate structures. Further, although the roll rotation tolerance portion and the pitch rotation tolerance portion are composed of the pin 400 and the pin receiving member 410 in these exemplary embodiments, the present invention is not limited to this configuration. The roll rotation tolerance portion and the pitch rotation tolerance portion may be constructed by using a pillow ball or the like.

Although the cart is disposed in front of the coaxial two-wheel vehicle in the first to third exemplary embodiments, the cart may be disposed behind the coaxial two-wheel vehicle.

Although the coaxial two-wheel vehicle is configured such that the coaxial two-wheel vehicle turns by rotating the vehicle main body in the roll direction in the first to third exemplary embodiments, the present invention is not limited to this configuration. A configuration in which a turning action is performed based on the change in the weights acted on the left and right step plates may be also employed. That is, the configuration of the coaxial two-wheel vehicle is not limited to any particular configuration.

So far, exemplary embodiments of a carrier vehicle and a coupling mechanism in accordance with the present invention are explained. However, the present invention is not limited to the above-described configurations and various modifications can be made without departing from the technical principle of the present invention.

INDUSTRIAL APPLICABILITY

The present invention relates to a carrier vehicle and a coupling mechanism. In particular, the present invention can be used as a carrier vehicle in which a cart loaded with baggage or people is pushed or pulled by a coaxial two-wheel vehicle to convey the baggage or people, and a coupling mechanism used in the carrier vehicle.

REFERENCE SIGNS LIST

1 CARRIER VEHICLE
2 COAXIAL TWO-WHEEL VEHICLE
3 CART
4 COUPLING MECHANISM
4a ROLL ROTATION TOLERANCE PORTION
4b PITCH ROTATION TOLERANCE PORTION
5 BAGGAGE
12 VEHICLE MAIN BODY
13 WHEEL
300 BASE PORTION
310 FREE CASTER
320 FRAME PORTION
400 PIN
410 PIN RECEIVING MEMBER
450 REACTIVE FORCE MEMBER SUCH AS SPRING

The invention claimed is:

1. A carrier vehicle comprising:
a coaxial two-wheel vehicle comprising two wheels arranged on a same axial centerline;
a cart disposed in front of the coaxial two-wheel vehicle; and
a coupling mechanism to couple the coaxial two-wheel vehicle with the cart,
wherein when a traveling direction is defined as a roll axis, the coaxial two-wheel vehicle performs a turning action by rotating a vehicle main body in a roll direction,
wherein the coupling mechanism comprises:
a pin disposed in one of the coaxial two-wheel vehicle and the cart; and
a pin receiving member disposed in another of the coaxial two-wheel vehicle and the cart, an insertion hole having an internal diameter larger than an external diameter of the pin being formed in the pin receiving member,
wherein the pin is disposed in a roughly vertical direction; an end portion of the pin is inserted into the insertion hole of the pin receiving member; and a roll rotation tolerance portion that tolerates, not only, rotation of the vehicle main body in the roll direction, but also relative vertical sliding between the pin and the pin receiving member that occurs when the vehicle main body rotates in the roll direction, and a pitch rotation tolerance portion that tolerates, when a left-and-right direction of the coaxial two-wheel vehicle is defined as a pitch axis, not only rotation of the coaxial two-wheel vehicle in a pitch direction but also relative vertical sliding between the pin and the pin receiving member that occurs when the coaxial two-wheel vehicle rotates in the pitch direction are formed between the end potion of the pin and the insertion hole of the pin receiving member,
wherein, in order to prevent the coaxial two-wheel vehicle from toppling over, the coaxial two-wheel vehicle has a pitch-tilting control state in which:
when the coaxial two-wheel vehicle rotates forward from a stopped state, the coaxial two-wheel vehicle moves forwards, whereas
when the coaxial two-wheel vehicle rotates backward from the stopped state, the coaxial two-wheel vehicle moves backward, and
wherein a height of the pin is set so that the pin is removed from the pin insertion hole of the pin receiving member by rotating the coaxial two-wheel vehicle backward even further compared to a maximum backward rotational angle in the pitch-tilting control of the coaxial two-wheel vehicle, and the pin is inserted into the pin insertion hole of the pin receiving member by rotating the coaxial two-wheel vehicle forward in the pitch direction from a state where the coaxial two-wheel vehicle is rotated backward even further compared to the maximum backward rotational angle in the pitch-tilting control of the coaxial two-wheel vehicle.

2. The carrier vehicle according to claim 1, wherein the carrier vehicle comprises two sets of coupling mechanisms.

3. The carrier vehicle according to claim 1, wherein in a peripheral portion of the pin, a reactive force member is disposed between a coupling portion between the pin and the coaxial two-wheel vehicle or the cart, and the pin receiving member.

4. The carrier vehicle according to claim 3, wherein the reactive force member is a spring.

5. The carrier vehicle according to claim 1,
wherein the cart is a wheeled platform,
wherein the cart comprises:
a base potion; and
a free caster disposed on an under surface of the base portion, and
wherein the pin is disposed in a rear end portion of the base portion.

6. The carrier vehicle according to claim 5, wherein a free caster disposed on a front side of the cart is disposed in the base portion in such a manner that the free caster can slide in a traveling direction of the cart with respect to the base portion.

7. The carrier vehicle according to claim 1, wherein the pin and the pin receiving member have a detachable configuration.

8. The carrier vehicle according to claim 1, wherein the insertion hole comprises a funnel portion that is tapered in an insertion direction of the pin and a cylinder-shaped through-hole.

9. The carrier vehicle according to claim 1, wherein a guide groove that guides the end portion of the pin to the insertion hole is formed in the pin receiving member.

10. The carrier vehicle according to claim 1, wherein the vehicle main body comprises left and right step plates on which left and right feet of a user are respectively placed, and the left and right step plates tilt in a roll direction of the coaxial two-wheel vehicle in a parallel state.

11. A coupling mechanism that is used when a coaxial two-wheel vehicle is coupled to a cart to form a carrier vehicle, the cart being disposed in front of the coaxial two-wheel vehicle, wherein
when a traveling direction is defined as a roll axis, the coaxial two-wheel vehicle performs a turning action by rotating a vehicle main body in a roll direction,
wherein the coupling mechanism comprises:
a pin disposed in one of the coaxial two-wheel vehicle and the cart; and
a pin receiving member disposed in another of the coaxial two-wheel vehicle and the cart, an insertion hole having an internal diameter larger than an external diameter of the pin being formed in the pin receiving member,
wherein the pin is disposed in a roughly vertical direction; an end portion of the pin is inserted into the insertion hole of the pin receiving member; and a roll rotation tolerance portion that tolerates, not only, rotation of the vehicle main body in the roll direction, but also relative vertical sliding between the pin and the pin receiving member that occurs when the vehicle main body rotates in the roll direction, and a pitch rotation tolerance portion that tolerates, when a left-and-right direction of the coaxial two-wheel vehicle is defined as a pitch axis, not only rotation of the coaxial two-wheel vehicle in a pitch direction but also relative vertical sliding between the pin and the pin receiving member that occurs when the coaxial two-wheel vehicle rotates in the pitch direction are formed between the end potion of the pin and the insertion hole of the pin receiving member,
wherein, in order to prevent the coaxial two-wheel vehicle from toppling over, the coaxial two-wheel vehicle has a pitch-tilting control state in which:
when the coaxial two-wheel vehicle rotates forward from a stopped state, the coaxial two-wheel vehicle moves forwards, whereas
when the coaxial two-wheel vehicle rotates backward from the stopped state, the coaxial two-wheel vehicle moves backward, and
wherein a height of the pin is set so that the pin is removed from the pin insertion hole of the pin receiving member by rotating the coaxial two-wheel vehicle backward even further compared a maximum backward rotational angle in the pitch-tilting control of the coaxial two-wheel vehicle, and the pin is inserted into the pin insertion hole of the pin receiving member by rotating the coaxial two-wheel vehicle forward in the pitch direction from a state where the coaxial two-wheel vehicle is rotated backward even further compared to the maximum backward rotational angle in the pitch-tilting control of the coaxial two-wheel vehicle.

12. A carrier vehicle comprising:
a coaxial two-wheel vehicle comprising two wheels arranged on a same axial centerline;
a cart; and
a coupling mechanism to couple the coaxial two-wheel vehicle with the cart, wherein the coupling mechanism comprises:
a pin disposed in one of the coaxial two-wheel vehicle and the cart; and
a pin receiving member disposed in another of the coaxial two-wheel vehicle and the cart, an insertion hole having an internal diameter larger than an external diameter of the pin being formed in the pin receiving member,
wherein the pin is disposed in a roughly vertical direction; an end portion of the pin is inserted into the insertion hole of the pin receiving member; and a roll rotation tolerance portion that tolerates, not only, rotation of a vehicle main body in the roll direction, but also relative vertical sliding between the pin and the pin receiving member that occurs when the vehicle main body rotates in the roll direction, and a pitch rotation tolerance portion that tolerates, when a left-and-right direction of the coaxial two-wheel vehicle is defined as a pitch axis, not only rotation of the coaxial two-wheel vehicle in a pitch direction but also relative vertical sliding between the pin and the pin receiving member that occurs when the coaxial two-wheel vehicle rotates in the pitch direction are formed between the end potion of the pin and the insertion hole of the pin receiving member,
wherein the insertion hole comprises a funnel portion that is tapered in an insertion direction of the pin and a cylinder-shaped through-hole disposed on an insertion direction side of the pin with respect to the funnel portion, the cylinder-shaped through-hole continuously extending to the funnel portion, and
wherein a surface located on one of the coaxial two-wheel vehicle side and the cart side in the pin receiving member vertically extends and continuously extends to the funnel portion, and comprises a guide groove that guides an end portion of the pin to the through-hole through the funnel portion.

\* \* \* \* \*